United States Patent [19]

Ferchau et al.

[11] Patent Number: 4,899,254
[45] Date of Patent: Feb. 6, 1990

[54] ELECTRONIC MODULE INTERCONNECTION SYSTEM

[75] Inventors: Joerg U. Ferchau, Morgan Hill; Hoa V. Pham, San Jose; Randall J. Diaz, Gilroy, all of Calif.

[73] Assignee: Tandem Computers Incorporated, Cupertino, Calif.

[21] Appl. No.: 76,458

[22] Filed: Jul. 22, 1987

[51] Int. Cl.[4] .................. H05K 7/20; H01R 13/629
[52] U.S. Cl. ........................... 361/384; 361/395; 361/413; 361/415; 439/246; 439/247
[58] Field of Search .............. 211/41; 361/383, 384, 361/391–395, 399, 412–415, 424, 428, 429; 439/65, 74, 76, 246, 247, 607

[56] References Cited

U.S. PATENT DOCUMENTS

| | | | |
|---|---|---|---|
| 2,871,457 | 1/1959 | Jencks et al. | 361/391 |
| 3,605,061 | 9/1971 | Martin | 361/413 |
| 3,925,710 | 12/1975 | Ebert | 361/383 |
| 3,992,686 | 11/1976 | Canning | 361/413 |
| 4,152,750 | 5/1979 | Bremenour et al. | 361/383 |
| 4,179,172 | 12/1979 | Godsey et al. | 361/413 |
| 4,337,499 | 6/1982 | Cronin et al. | 361/413 |
| 4,510,553 | 4/1985 | Faultersack | 361/412 |

FOREIGN PATENT DOCUMENTS 57-20458  2/1982  Japan ..................... 361/384

*Primary Examiner*—Gregory D. Thompson
*Attorney, Agent, or Firm*—Townsend and Townsend

[57] ABSTRACT

A system interconnects electronic modules with one another, to a power supply and to signal lines through a printed circuit board. The modules are electrically connected to traces on the printed circuit board using blind mateable connectors. EMI shielding plates are mounted to the circuit board at the I/O connectors for the external cables. Guide elements, such as pin and socket guides and printed circuit board edge guides, are mounted to the circuit board to guide the blind mateable connectors. The system eliminates the numerous cables which would otherwise be required. The printed circuit board is mounted within the system housing and acts as an air duct barrier to aid proper air circulation. The circuit board also acts as a structured element helping to stabilize the housing and various module supports and serves as a mounting structure for various elements, such as cooling fans.

3 Claims, 4 Drawing Sheets

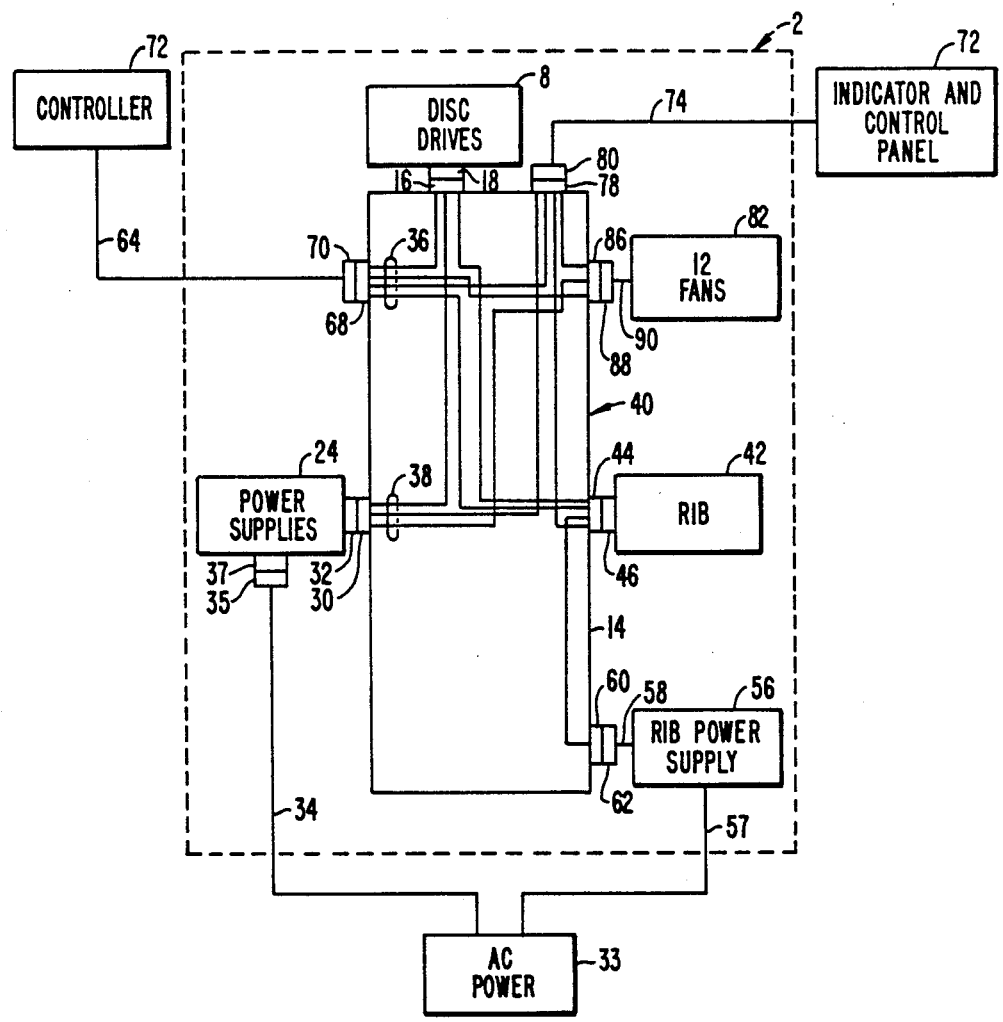
FIG._1.

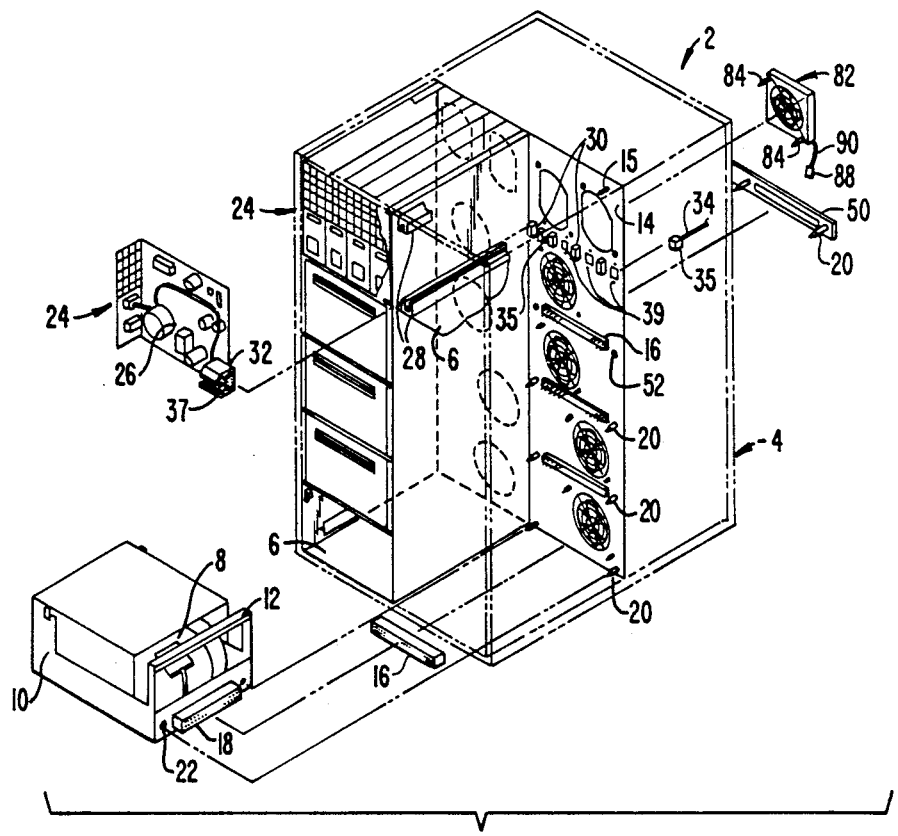
FIG._2A.
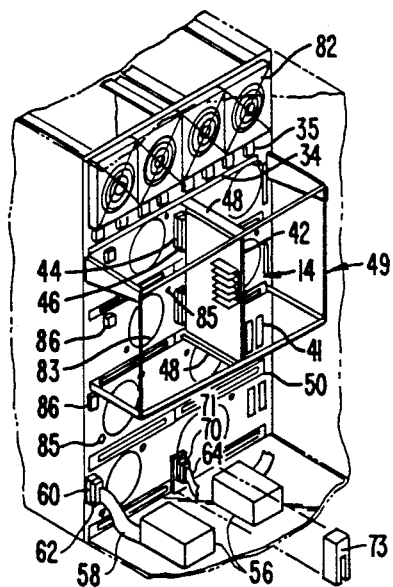
FIG._2B.

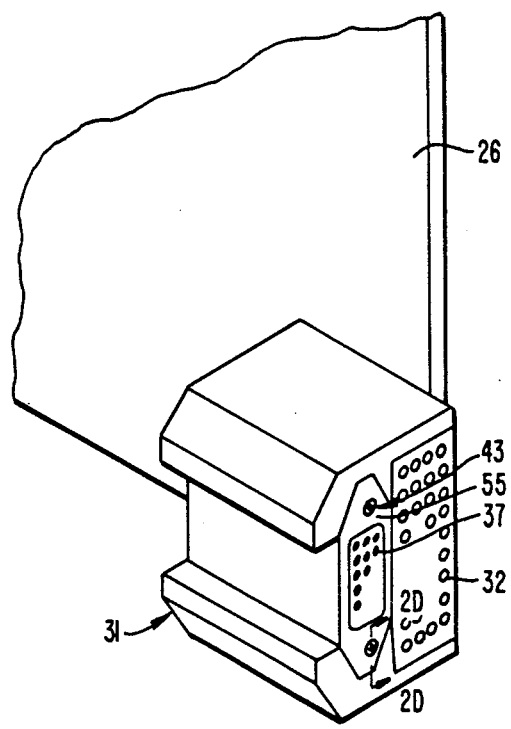
FIG._2C.
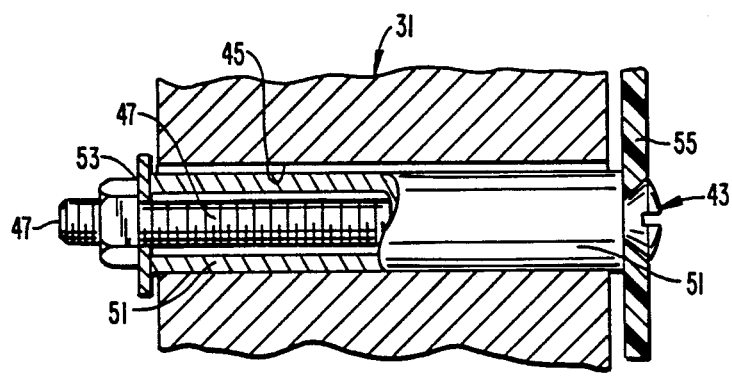
FIG._2D.

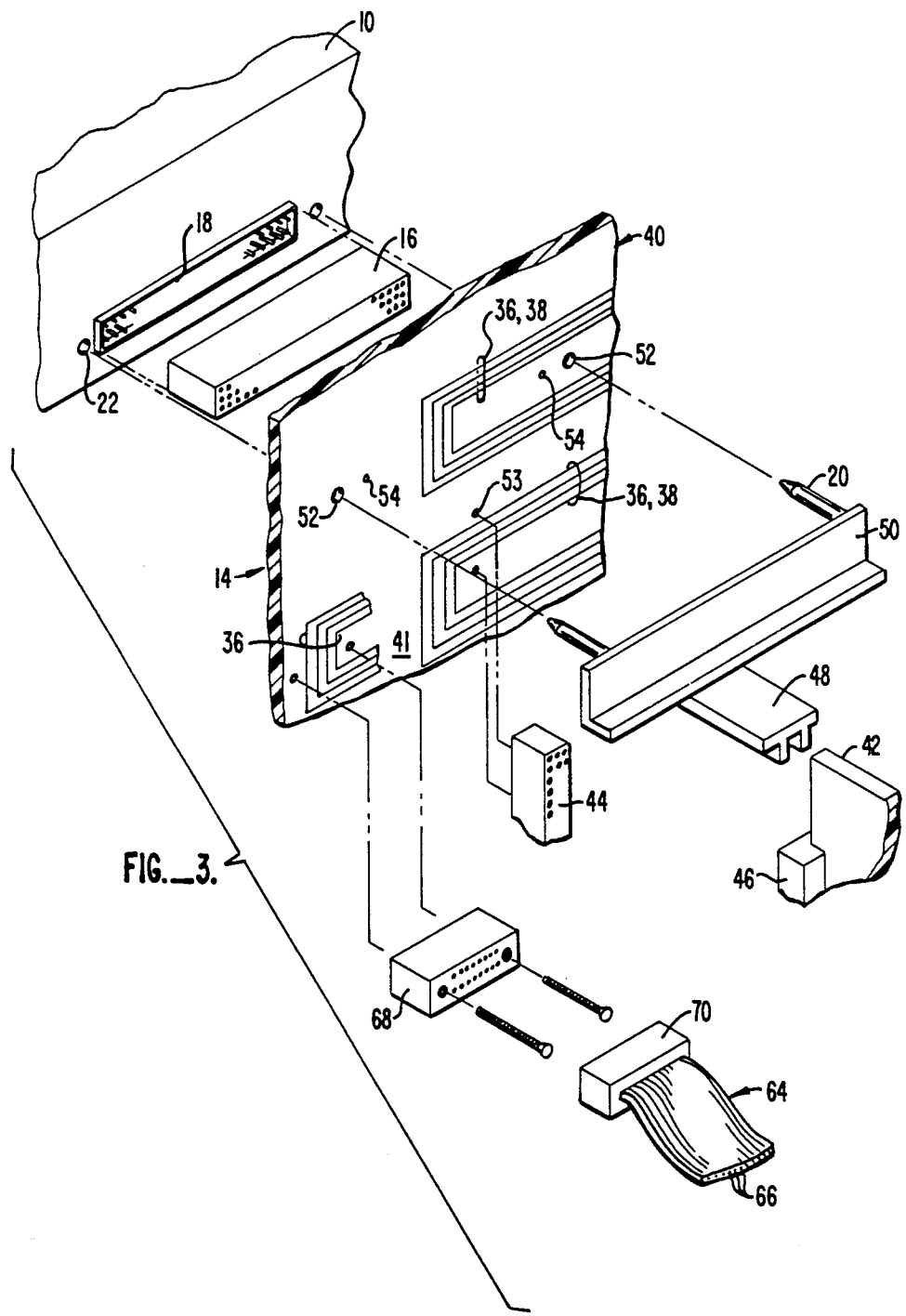
FIG._3.

ELECTRONIC MODULE INTERCONNECTION SYSTEM

BACKGROUND OF THE INVENTION

This invention relates to systems for interconnecting electronic modules, in particular one which eliminates most cables between the modules to save space, to simplify assembly and repair and to reduce misconnections.

Some electronic systems are constructed of removable and replaceable modules. In some cases modules are used as an aid in the repair of the system. After determining which module may contain the defective component, the suspect module is simply replaced with a module known to be operational.

Other systems are designed with a great deal of redundancy built into them so that if one component, such as a disk drive in a computer system, fails, another like component automatically take over the tasks of the failed component. Redundant operational systems therefore contain sets of essentially identical components. This type of system is often used when any down time of the system is unacceptable, such as is the case with computer systems used for banking applications. Since it is necessary to remove, repair and replace the defective component while the system is operating, the redundant components are usually modular: that is, the component (usually a set of components constituting a subassembly) can be removed from the system without the need to remove or otherwise interfere with other components.

Modularized electronic systems, especially redundant modularized systems, commonly require that the modules be interconnected with one another, connected to various data and control lines and connected to appropriate power supply lines. The number of these interconnections can create a tangle of cables within the system cabinet. For example a system housed within a single cabinet including eight disk drives eight disk drive power supplies, twelve fans and two electronic component circuit boards can require more than one hundred cables to interconnect the modules. Not only do the cables take up a lot of room and make it difficult to remove a malfunctioning module the great number of connections which must be made greatly increases assembly time and the chance of a misconnection.

SUMMARY OF THE INVENTION

The invention is directed to an electronic module interconnection system which uses backplane architecture to interconnect electronic modules with one another, to power supplies and to signal lines through a backplane circuit board. The invention is also useful for interconnecting I/O cables and fiber optic components as well. The modules are preferably positioned on either side of the backplane circuit board. The circuit board has power supply traces and signal traces fabricated as integral parts of the backplane circuit board. At least some of the modules have first blind mateable connectors for coupling the modules to second blind mateable connectors mounted to a backplane circuit board and electrically connected to the power supply and signal traces. The use of blind mateable connectors aids removal and replacement of the modules. The signal lines are typically coupled to input connectors mounted to the backplane circuit board and electrically connected to the signal traces. The power supplies can be coupled to the power supply traces by either second blind mateable connectors or by conventional input connectors. Therefore, the second blind mateable connectors and the input connectors are electrically coupled to one another through the power supply and signal traces.

Guide elements such as pin and socket guides and edge guides, are mounted to or adjacent the circuit board at positions appropriate to the positions of the second blind mateable connectors. The guide elements guide the modules to permit the blind mateable connectors to engage one another in a blind fashion. That is, the user simply engages the guide elements and pushes the modules against the backplane circuit board; the guide elements ensure that the connectors align and properly mate when the module is against the backplane circuit board. The module guide elements are preferably secured to the backplane circuit board and are positioned by holes formed in the backplane circuit board.

An important feature of the invention is the use of holes in the circuit board to position the second blind mateable connectors, the input connectors and the module guide elements. This is true because holes can be positioned in circuit boards very accurately relative to the location of the traces on the circuit board. Accurate positioning of the second blind mateable connectors and the input connectors is important so that proper contact is made with the correct traces. Accurate positioning of the guide elements relative to the second blind mateable connectors is necessary to allow the blind mateable connectors to properly mate.

The backplane circuit board can be made to provide structural rigidity and thus act as a structural member of the system. In addition to mounting the various modules and the guide elements to the circuit board, fans or other components can also be mounted to the circuit board when desired. Preferably the fans are mounted using push on fasteners to speed up initial assembly and to make replacement of the fans much easier. If the fans are AC powered, separate power cables would preferably be routed to the fans since it is generally advisable to separate AC lines from the backplane circuit board. If DC fans are used, the fans can be connected to power supply traces on the circuit board. Such connection can be through blind mateable connectors or through conventional connectors. Even when conventional connectors are used, the power lead from the fan can be relatively short since it only needs to connect to a mating connector on the backplane circuit board. The backplane circuit board also serves as an air duct barrier to promote proper air flow within the unit.

The shields of external cables are preferably grounded by grounding plates mounted to the backplane circuit board. The grounding plates also act as EMI shields as well.

Other features and advantages of the invention will appear from the following description in which the preferred embodiment has been set forth in detail in conjunction with the accompanying drawings.

BRIEF DESCRIPTION OF THE DRAWINGS

FIG. 1 is a schematic diagram of a system having a number modules coupled by the electronic module interconnection system of the invention.

FIGS. 2A and 2B are partially exploded perspective and perspective views of the two sides of the backplane circuit board of FIG. 1 illustrating the physical and functional relationships among the various modules, connectors and module guide elements.

FIG. 2C is an enlarged isometric view of the power supply connectors of FIG. 2A.

FIG. 2D is a cross-sectional view taken along line 2D—2D of FIG. 2C.

FIG. 3 is an exploded isometric view of an idealized portion of the system of FIG. 1 illustrating the backplane circuit board relative to various components mounted to it.

DETAILED DESCRIPTION OF THE PREFERRED EMBODIMENT

Referring to FIG. 1, an electronic system 2 is illustrated in schematic form. System 2 is a portion of a high reliability computer system using redundancy of components to achieve continuous operation of the computer with no downtime. System 2, as seen in FIGS. 2A and 2B. is contained within a housing 4 and includes a racking structure 6 for housing eight disk drives 8. Each disk drive 8 is housed within a removable drawer 10 so that the disk drive can be removed and replaced by simply removing the drawer containing the disk drive. Drawers 10 are supported and guided by racking structure 6. The inner end 12 of drawer 10 faces a backplane circuit board 14, shown in FIG. 2A, mounted centrally within housing 4. Circuit board 14 has a sufficient structural strength to add to the structural strength of system 2. In particular, racking structure 6 is secured to circuit board 14 using pins 15 extending from three corners of circuit board 14. This arrangement not only provides proper alignment of racking structure 6 and circuit board 14, circuit board 14 acts as cross bracing for racking structure 6 so structure 6 need not be made as rigid as if it were to be free standing.

Electrical connections to and from disk drive 8 are through disc blind mateable connectors 16, 18. See FIGS. 2A and 3. These connectors may be of the type disclosed in U.S. patent application Ser. No. 898,878 for Alignment and Connection Mechanism, now U.S. Pat. No. 4,682,833, the disclosure of which is incorporated by reference. As discussed in more detail below, connector 16 is mounted to circuit board 14 while connector 18 is mounted to a circuit board (not shown) in drawer 10 and is electrically connected to disk drive 8. Proper engagement of connectors 16, 18 is ensured by guidance provided by racking structure 6 of housing 4 and by guide pins 20, mounted to circuit board 14 on either side of connector 16, and by guide sockets 22. formed in drawer 10.

Eight DC power supplies 24 are mounted within housing 4. Power supplies 24 include printed circuit boards 26 supported vertically by edge guides 28. (Only one set of edge guides 28 is shown in FIG. 2A for clarity.) Edge guides 28 are mounted to racking structure 6 in housing 4 to properly position circuit boards 26 relative to backplane circuit board 14. Edge guides 28 position and guide circuit board 26 as power supplies 24 are inserted into and removed from housing 4. Doing so properly orients DC power supply blind mateable connectors 30, 32 mounted to backplane circuit board 14 and circuit board 26, respectively. Electrical connections between DC power supplies 24 and backplane circuit board 14 are thus achieved through the blind mating of connectors 30, 32.

Power supplies 24 are provided AC power from an AC power source 33 along AC lines 34 through connectors 35, 37. See FIGS. 1, 2A and 2B. For safety reasons AC lines 34 are not part of backplane circuit board 14. See FIG. 1. However, it is desirable that connectors 35, 37 connect and disconnect generally simultaneously with connectors 30, 32. To accomplish this, connectors 35 (only one of which is shown in FIG. 2A) are mounted within holes 39 in board 14 and secured to board 14. Holes 39 are positioned so connectors 35 mate with connectors 37 simultaneously with the engagement of connectors 30, 32 as power supply 24 is moved along edge guides 28 towards backplane circuit board 14.

Connectors 32, 37 are mounted to printed circuit board 26 by a centering block 31. See FIGS. 2C and 2D. Connector 32 is rigidly mounted to block 31 while connector 37 is loosely or floatably mounted to block 31 by a pair of fasteners 43 passing through oversized holes 45 in block 31. Fasteners 43 each include a screw 47 over which a stand-off 51 is mounted. A nut and washer combination 53 secures stand-off 51 between combination 53 and the mounting plate 55 of connector 37. Since stand-off 51 is longer than hole 45 and has a smaller diameter than hole 45, fasteners 43 loosely mount connector 37 to block 31 so that connectors 32, 37 can shift or float relative to one another. This helps reduce the effects of tolerance build-up to help ensure proper mating of the connectors.

FIG. 3 is an idealized representation of a portion of system 2. It is provided to better illustrate the interconnections among various components and circuit board 14. Board 14 includes signal traces 36 and power supply traces 38 to which connectors 16. 30 (see FIGS. 1 and 2A) are electrically connected. Traces 36. 38 permit interconnection among disk drives 8 and connection between disc drives 8 and power supplies 24 without the need for cables. Together backplane circuit board 14, traces 36, 38, and the various connectors mounted to board 14, such as connectors 30, are collectively designated backplane architecture 40. Backplane architecture 40 eliminates the mess and confusion associated with interconnecting various modules such as disk drives 8 and power supplies 24 of system 2 using conventional cables. Board also acts as a structural member of system 2 to which components can be mounted.

The other side 41 of circuit board 14 has a pair of electrical modules 42 (only one of which is shown in FIG. 2B), called radial interface boards (RIBs), coupled to signal and power supply traces 36. 38 by RIB blind mateable connectors 44, 46 mounted to circuit board 14 and modules 42, respectively. Modules 42 are guided into position through the use of edge guides 48 (see FIG. 3) which are supported by cantilevered racking 49. Edge guides 48 are structurally similar to edge guides 28. Cantilevered racking 49 is connected to and extents from a support bar 50. Guide pins 20 are also mounted to support bar 50, as illustrated in FIGS. 2A and 3, and pass through positioning holes 52 in circuit board 14. Positioning holes 52 are accurately positioned relative to traces 36, 38 add connector holes 54. Holes 54 are used to mount disk blind mateable connectors 16 to circuit board 14. Since holes 52, 54 can be accurately positioned relative to traces 36, 38, the blind mateable connectors 16 and the guide elements (in the preferred embodiment provided by guide pins 20 and guide sockets 22 for drawers 10 and edge guides 28, 48 for power supplies 24 and RIB modules 42) can be accurately positioned relative to the traces and to one another. Similar holes are used to mount blind mateable connectors 30, 44 to backplane circuit board 14.

In the preferred embodiment. a separate power supply 56 is used to provide DC power to each module 42.

Power supply 56 (only one of which is shown in FIG. 1) is connected to AC power source 33 by a cable 57. The DC power is provided from power supply 56 to appropriate power traces 38 through a RIB DC cable 58 and RIB connectors 60, 62 mounted to backplane circuit board 14 and the outer end of cable 58, respectively.

An input/output signal cable 64, carrying signal lines 66 (See FIG. 3), is connected to signal traces 36 through an input connector 68 (see FIG. 1), mounted to circuit board 14 and electrically connected to signal traces 36, and a source connector 70, mounted to cable 64 and electrically connected to signal lines 66. A grounding plate 71 (see FIG. 28) is mounted over connector 68 so to be in contact with connector 68 and housing 4. In this way externally originating cable 64 can be grounded to housing through connector 68 and plate 71. Plate 71 also acts as an EMI shield so to shield circuit board 14 from EMI which may be generated by signal cable 64. An EMI cover 73 is mounted over connectors 68, 70 and to plate 71 to provide further EMI shielding. If desired circuit board 14 can be made with EMI shielding incorporated in it.

In the preferred embodiment, signal lines 66 include both data and control signal lines. Thus, connection between the controller 72 of the computer with which system 2 is used is achieved through cable 64. A cable 74 connects an indicator and control panel 76 with signal traces 36 through appropriate connectors 78, 80.

Twelve fans 82 (see FIGS. 2A and 2B) are mounted to circuit board 14 at openings 83 using conventional spring clip push mounts 84, 85. Circuit board 14 acts as an air duct barrier to promote the proper air flow within housing 4. Fans 82 are DC fans and obtain their power from power supplies 24 through power supply traces 38. Electrical connection between fans 82 and traces 38 is through conventional electrical connectors 86. 88. Connector 86 is mounted to backplane circuit board 14 while connector 88 is mounted to the end of a power supply 90 extending from fan 82. Use of push mounts 84, 85 to mount the fans 82 to circuit board 14 simplifies both initial assembly and replacement of fans 82. Using DC fans, as opposed to AC fans, allow the fans to be connected to appropriate power supply traces 38 to reduce the length of power supply cables 90 to a relatively nominal length. If desired, appropriate guide elements and blind mateable fasteners could be used with fans 82.

During operation of system 2 it may be necessary to replace one of the modular components. For example, disk drive 8 in one of drawers 10 may develop a fault. After determining which disk drive 8 is expected to be faulty, the drawer 10 associated with a suspect disk drive is removed by sliding drawer 10 out from racking structure 6 and housing 4. Doing so automatically disconnects connectors 16, 18 thus isolating disk drive 8 from signal and power source traces 36, 38. Module 42 can be removed in a similar manner by sliding module 42 from between edge guides 48 thus disconnecting connectors 44, 46. Removal of a faulty power supply 24 is likewise accomplished by sliding the power supply between edge guides 28; when this occurs. connectors 30, 32 and 35, 37 disengage. Connectors 30, 32 disconnect power supply 24 from power supplies traces 38 while disconnecting connectors 35, 37 separates power supply 24 from AC power source 33. If a fan 82 is causing problems, its associated connector 88 is disconnected from connector 86 and the fan can simply be pulled away from circuit board 14 causing the uncoupling of its push mounts. Input/Output signal cable 64 can be disconnected from circuit board 14 by separating connectors 68, 70 while RIB DC power supply cable can be disconnected from circuit board 14 by disconnecting connectors 60, 62.

Modification and variation can be made to the disclosed embodiment without departing from the subject of the invention as defined in the following claims. For example, instead of having two different types of power supplies 24, 56, a single power supply or set of power supplies could be used. Other electrical component modules instead of, or in addition to, those disclosed can be used with the invention. Although it is preferred that connections be made to both sides of backplane circuit board 14, the invention would also be useful for circumstances in which all connections are made on one side.

We claim:

1. An electronic system of the type including electronic modules coupled to a power supply and to signal lines, and system comprising:

a housing;

a circuit board mounted within the housing and forming a structural support element of the system, the circuit board including power supply traces and signal traces connected to the power supply and to the signal lines, respectively;

a first blind mateable connector mounted to each of the modules;

second blind mateable connectors mounted to chosen positions on the circuit board for connection with chosen ones of the power supply and signal traces, the second blind mateable connectors configured for mating engagement with respective ones of the first blind mateable connectors;

a fan mounted to the circuit board at a selected position;

the circuit board having an opening at the selected position to allow air to be forced therethrough by the fan, the circuit board configured to divide the housing into sections so the circuit board acts as an air duct barrier; and module guide elements for guiding the modules into position adjacent the circuit board so the first and second blind mateable connectors engage one another thus interconnecting the modules with one another and connecting the modules to the power supply and to the signal lines.

2. The electronic system of claim 1 wherein at least one of the modules includes at least two first blind mateable connectors mounted to the at least one module for at least one of the two first blind mateable connectors mounted for floatable movement to aid proper alignment.

3. An electronic system of the type including electronic modules coupled to a power supply and to signal lines, and system comprising:

a housing;

a circuit board mounted within the housing and forming a structural support element of the system, the circuit board including power supply traces and signal traces connected to the power supply and to the signal lines, respectively;

a first blind mateable connector mounted to each of the modules;

second blind mateable connectors mounted to chosen positions on the circuit board for connection with chosen ones of the power supply and signal traces, the second blind mateable connectors configured for mating engagement with respective ones of the first blind mateable connectors;
a mounting block mounted to at least one of the modules; and
at least two first blind mateable connectors mounted to the mounting block, at least one of the two first blind mateable connectors floatably mounted to the mounted block to aid proper alignment.

* * * * *